D. E. Holt.

Cultivator.

N° 96,322. Patented Nov. 2, 1869.

Witnesses
Rufus R. Rhodes
H. N. Jenkins

Inventor
D. E. Holt

UNITED STATES PATENT OFFICE.

D. E. HOLT, OF WILKINSON COUNTY, MISSISSIPPI.

IMPROVEMENT IN COMBINED CULTIVATOR AND SEED-PLANTER.

Specification forming part of Letters Patent No. 96,322, dated November 2, 1869.

*To all whom it may concern:*

Be it known that I, DAVID E. HOLT, of Wilkinson county, State of Mississippi, have invented a certain new and useful Improvement in a Combined Cultivator and Seed-Planter; and I do hereby declare the following to be a full, clear, and exact description of the same, reference being had to the annexed drawings, making a part of this specification, in which—

Figure 1:
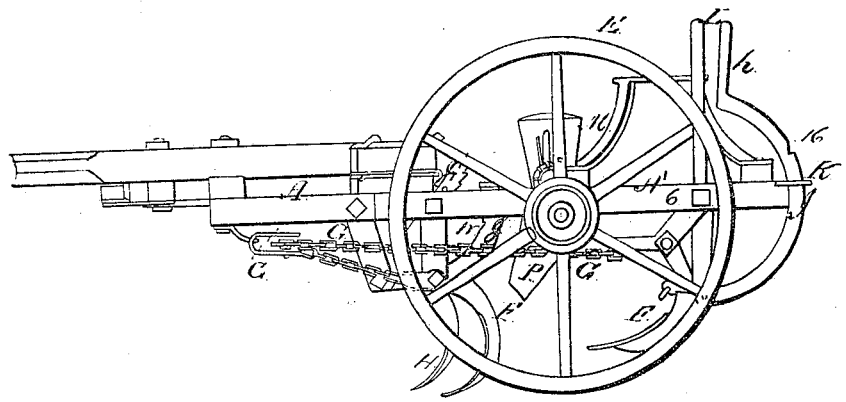
Figure 2:
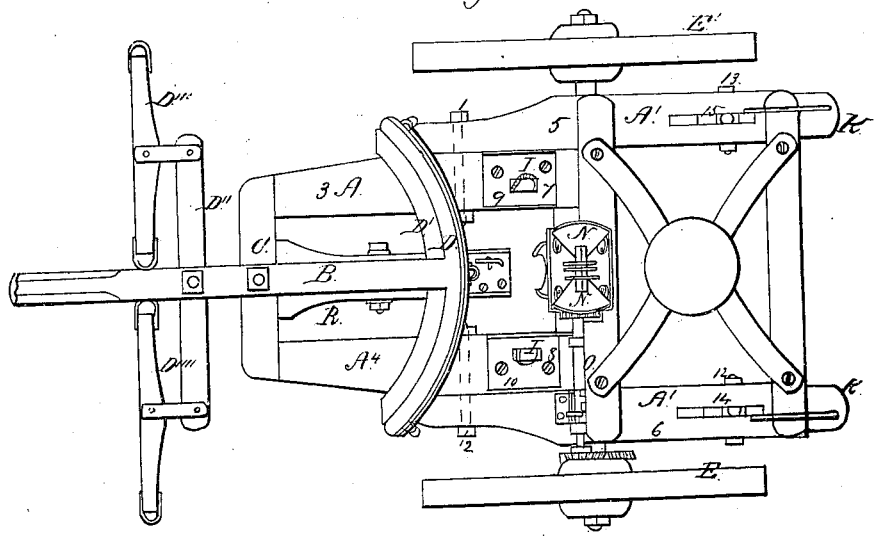

Figure 1 is a side elevation, and Fig. 2 a plan or top view, of my said improvement.

The first part of my invention relates to a means for holding up off the ground the plows of a cultivator, in which the arrangement is substantially the same as that which obtains in Daniel S. Stafford's cultivator, as patented January 6, 1863, without keeping any part of the frame of the machine in a tilted or inclined position to effect this object, as must be done in the case of the said Stafford's arrangement, my object being to facilitate the operation of turning around the machine, and to keep the plows off the ground when the machine is to be carried from one field or place to another, without imposing on the driver the disagreeable duty of holding with his hand one part of the machine, so as to keep it out of its normal position with respect to the other.

The second part of my invention consists of putting on the machine an additional plow, to open a furrow or trench for receiving either cotton-seed or corn, and a hopper that is made so as to be convertible into a cotton-seed or corn planting hopper, for depositing either the one or the other seed, as the occasion may require, in said trench, with the object of incorporating in one and the same machine the means for cultivating or breaking up the ground and of planting either cotton-seed or corn at one and the same time.

But my invention will be better understood by referring to the drawings, on which the same letters denote the same parts at both the figures.

A A' are the two principal parts of the frame of the machine, that are connected together by the bolts 1 2, so that they can be depressed at that point at pleasure, and consequently be elevated at their front and rear extremities, respectively.

B is the draft tongue or pole, which, pivoted on the cross-piece C, and provided with the usual traversing segmental guide, D, at its rear end, resting on a similarly-formed plate, D', and with cross-bar D'', for the attachment of single-trees D''' and D'''', constitutes an ordinary means for connecting to the machine the animals, to pull or operate it in its actual use.

The frame A A' is supported on wheels E E', substantially as shown.

To each of the pieces 3 and 4 of the part A, I secure a plow, F, and to each of the pieces 5 and 6 of the part A' a similar plow, F', (two only of the same being shown in the drawings,) by pivot-joints, which will allow said plows to move backward and forward within prescribed limits.

Each of the plows F is connected with the plow F', that is immediately behind it, by means of a chain, G, which passes through a pulley-block, G', that is attached to the beam to which the plow F is secured or pivoted, near the front end of said beam, as shown, so that if either of the four plows in the practical operation of the machine comes into contact with an obstruction—as, for example, a stump, root, or stone—it will yield, and hence pass over the same and instantly afterward resume its normal position automatically, in consequence of the greater pressure on the other.

A little in advance of the front plows, F, to the central longitudinal piece, R, of frame A, is secured, also by a pivot connection, a fifth plow, H, to serve as a trench-opener for the seed to be planted, whether the same be cotton-seed or corn.

Behind the plows F F, I secure, respectively, to them by pivot-points upwardly-projecting curve bars I, which, passing through slots 7 and 8, which are faced with metal plates 9 10, and being pivoted with notches or ratchets 11, constitute an effectual means for holding the said plows off the ground whenever it is desired so to do, for it will be seen that the notches are so cut and placed that when they take over the metallic plates with which the sides of the slots 7 and 8 are faced, the said plows will be lifted some inches above the ground and be so held until the said bars are pushed back far enough to remove said notches off said plates.

To the rear part of the trench-opening plow H, instead a curved bar with a notch in it, I pivot a straight ratchet-bar, J, the ratchet or teeth being so cut as to hold the plow against the backward pressure of the earth in the operation of the machine, at whatever angle it may be placed. Small holes through this bar, in which a pin may be inserted, provide the means for holding the plow H off the ground whenever occasion may require.

Behind the plows F, in addition to the pivoted curved notched bars I, which extend considerably above the extension-plates K through slots in which they pass, and terminate in handles $k$, but which in all other respects are substantially identical with the front bars I, and operate in the same way, I secure hand-levers L in a permanent or immovable manner. These levers have their fulcra on pins or bolts 12 13, and, passing through long slots 14 15, give to the driver a means for elevating the plows by a backward movement of their upper ends, which movement brings the bars I down until the notches 16 come or catch under the plates K, and hence hold the plows up until the driver, by taking hold of the handles $k$ and pulling the bars I forward, permits them to pass up through the slots in the plates K until they assume substantially the position shown at Fig. 1, which brings the plows back upon or in the ground. The same effect is produced by a pressure of the driver's foot on the rear end of the piece 3 or 4 of the part A of the frame, while at the same time, by the tilting of this part, the bars I, that connect with the plows F, will be forced up through the slots 7 and 8 until the catch-like upper side of the notch 11 takes over the edges of the plates 9 and 10, for that pressure will also tilt part A' and lift the plows F' out of and off the ground, which, as soon as this is done, will by their gravity swing on their pivot-connections with the frame toward the front of the machine, and thus draw down the bars I until the notches 16 therein take over the lower edge of plates K, so that, when the driver takes his foot and weight off the part A, both parts will resume their normal position, as shown on the drawings, with the four plows all off the ground.

When the machine has been turned around, or for any other reason it is desired to drop the plows again into position for work, the driver has only to press or kick the front bars I back with his foot and to throw back the rear bars I with his hand by means of the handles $k$ to effect this object. Indeed a cross-bar may connect the two front bars I and another the rear bars I above the frame A A', so as to place it within the power of the driver to lower the plows by a single movement of his hand and foot.

Just in front of the axle-wheels E E', I place on the frame A' a seed-planting hopper, M, which is so contrived by means of supplemental interior adjustable sides N and proper appliances for planting either cotton-seed or corn, and for agitating or stirring the same to prevent the packing or clogging thereof, that it is readily convertible into the diverse conditions that are required to fulfill the one and the other purpose. The planting and agitating cylinders with their appliances are rotated by a shaft, O, and proper gearing connected therewith and with said cylinders and with wheel E.

Below the hopper M a suitable sleeve, P, affords a means for conveying the seed in such manner that they will fall in the center of the trench or furrow that is cut by the plow H.

Having thus described my invention, what I claim, and desire to secure by Letters Patent, is—

1. The curved bars I, in combination with the plows F F' and a frame consisting of parts A and A', that are connected together by bolts 1 and 2, when all the parts are constructed, arranged, and operate substantially as herein described, for the purpose set forth.

2. The above combination, in combination with a trench-opening plow, H, that is provided with an adjusting-bar, J, and with a hopper, M, that is provided with adjustable supplemental sides N, a cylinder that will plant cotton-seed or corn, and an agitating-cylinder above the same, which are driven by a shaft, O, and suitable gearing connected therewith and with the wheel E, when all the parts are constructed and arranged with respect to each other, and operate substantially as described, for the purpose set forth.

D. E. HOLT.

Witnesses:
RUFUS R. RHODES,
H. N. JENKINS.